United States Patent
Rai

(10) Patent No.: US 10,015,708 B1
(45) Date of Patent: Jul. 3, 2018

(54) CONTROLLING HANDOVER OF A UE BASED ON DATA BUFFERING

(71) Applicant: Sprint Spectrum L.P., Overland Park, KS (US)

(72) Inventor: Deveshkumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 84 days.

(21) Appl. No.: 15/298,062

(22) Filed: Oct. 19, 2016

(51) Int. Cl.
| | |
|---|---|
| H04W 36/02 | (2009.01) |
| H04W 36/08 | (2009.01) |
| H04W 36/38 | (2009.01) |
| H04W 88/02 | (2009.01) |
| H04W 88/08 | (2009.01) |

(52) U.S. Cl.
CPC ......... *H04W 36/023* (2013.01); *H04W 36/08* (2013.01); *H04W 36/38* (2013.01); *H04W 88/02* (2013.01); *H04W 88/08* (2013.01)

(58) Field of Classification Search
CPC ... H04W 36/023; H04W 36/08; H04W 36/38; H04W 88/02; H04W 88/08
See application file for complete search history.

(56) References Cited

U.S. PATENT DOCUMENTS

| | | | | |
|---|---|---|---|---|
| 2004/0005893 A1* | 1/2004 | Isobe | ...................... | H04L 45/00 455/436 |
| 2004/0165530 A1* | 8/2004 | Bedekar | .................. | H04L 47/10 370/235 |
| 2006/0030323 A1* | 2/2006 | Ode | ....................... | H04W 36/30 455/436 |
| 2008/0240074 A1* | 10/2008 | Le-Faucheur | ......... | H04J 3/0632 370/350 |
| 2008/0254802 A1* | 10/2008 | Ohta | ................. | H04W 36/0072 455/440 |
| 2011/0228685 A1* | 9/2011 | Higashi | ................... | H04L 47/10 370/252 |
| 2016/0183130 A1* | 6/2016 | Farkas | .................. | H04W 72/12 455/436 |

\* cited by examiner

*Primary Examiner* — Kashif Siddiqui

(57) ABSTRACT

Disclosed is a method and system to help manage handover of a UE based on data buffering. In accordance with the disclosure, when a base station receives data destined for a UE, the base station may record the received data into a data buffer for temporary storage and retrieve the data at some later time to transmit the data to the UE. The base station may then determine, based at least in part on an amount of elapsed time from recording the data to retrieving the data, whether to invoke handover of the UE from being served by the base station to being served by a different, neighboring base station.

20 Claims, 4 Drawing Sheets

CONTROLLING HANDOVER OF A UE BASED ON DATA BUFFERING

BACKGROUND

A typical wireless communication system includes a number of base stations each radiating to provide wireless coverage areas, such as cells and cell sectors, in which to serve user equipment devices (UEs) such as cell phones, tablet computers, tracking devices, embedded wireless modules, and other wirelessly equipped devices, whether or not user operated. In turn, each base station may sit as a node on a core access network that includes entities such as a network controller, switches, and/or gateways, and the core network may provide connectivity with one or more external transport networks such as the public switched telephone network (PSTN) and the Internet. With this arrangement, a UE within coverage of the system may engage in air interface communication with a base station and may thereby communicate via the base station with various remote network entities or with other UEs served by the base station.

Such a system may operate in accordance with a particular radio access protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each protocol may define its own procedures for registration of UEs, initiation of communications, handover between base station coverage areas, and other functions.

Further, each base station may provide wireless service to UEs on one or more carrier frequencies, with the air interface defining various downlink and uplink channels. For instance, on the downlink, the air interface may define a reference channel for carrying a reference signal that UEs can measure to evaluate base station coverage strength, the air interface may define various other downlink control channels for carrying control signaling to UEs, and the air interface may define one or more downlink traffic channels for carrying bearer data and other information to UEs. And on the uplink, the air interface may define an access channel for carrying UE access requests to the base station, the air interface may define one or more other uplink control channels for carrying control signaling to the base station, and the air interface may define one or more uplink traffic channels for carrying bearer data and other information to the base station.

When a UE initially enters into coverage of such a system, the UE may scan for a strongest base station coverage area in which to operate, and the UE may then engage in signaling with and via the base station, to register for service. The UE may then be served by the base station in a connected state in which the UE has an established radio-link-layer connection with the base station through which the UE and base station may exchange bearer data (e.g., application-layer communications), facilitating communication by the UE on the external transport network for instance.

When so served, the UE may also regularly monitor coverage strength from its serving base station and from adjacent base stations, to help ensure that the UE is served with sufficiently strong coverage and perhaps with the strongest available coverage. If the UE's coverage from its serving base station becomes threshold weak and if another base station's coverage becomes threshold strong (e.g., threshold stronger than the serving base station's coverage or than a defined level), then the UE may engage in signaling with its serving base station, and the serving base station may take action to coordinate handover of the UE to the other base station, thereby improving the quality of service to the UE.

OVERVIEW

In any such wireless communication system, each carrier on which a base station provides service will have a limited supply of resources for transmitting data to served UEs. For instance, each carrier will have a limited frequency bandwidth. Further, depending on the air interface protocol, only certain portions of a carrier's frequency bandwidth and/or certain segments of time may be designated for use to carry data to served UEs. Other resource limitations may be possible as well.

In order to help fairly manage data transmission resources given this limitation, the base station may be configured to impose a per-UE data transmission rate cap when air interface resources are in high use. When applying such a rate cap on the carrier, as the base station receives data packets for transmission to a UE on the carrier, the base station may limit its rate of transmission of that data to be no greater than the rate cap.

As such, there may be situations in which the base station receives data faster than the base station transmits the received data to a UE. In particular, if the base station receives data destined for a particular UE at a greater rate than the rate cap, then the base station may transmit the received data to the UE at or below the capped rate while buffering any excess data (e.g., data received at a rate that exceeds the rate cap). For this purpose, the base station may establish and maintain in physical data storage a respective data buffer for each such UE, with each such data buffer being statically or dynamically sized.

In practice, when the base station is buffering excess data for transmission to a UE, the base station will record the excess data in the data buffer, and the excess data will reside there for some time duration until the base station is ready to transmit the excess data. Then, the base station will retrieve the excess data from the data buffer and transmit the excess data to the UE. The time duration for which the excess data is stored in the data buffer may vary depending on the circumstances. For instance, the base station could employ a first-in first-out (FIFO) method in which data is retrieved from the data buffer in the same order that the data is recorded in the data buffer. In such a system, data recorded in a substantially full data buffer could have a longer buffer time than data recorded in a substantially empty data buffer. Long buffer times could add significant delay to data transmissions to the UE, thereby resulting in a poor user experience.

Ideally, the rate at which the base station accumulates excess data for transmission to the UE will vary over time, so that the extent of data that the base station has buffered for transmission to the UE will not grow out of control, keeping buffer times low. However, this may not always be the case. Therefore, to help manage the extent of data stored in the data buffer, the base station may also be configured to occasionally discard data packets from the data buffer if the data buffer becomes threshold full (e.g., if the quantity of data stored in the data buffer exceeds a predefined quantity) or if the data packets timeout (e.g., if the data packets are stored in the data buffer for a predefined duration), for instance. But discarding data packets from the data buffer could prevent such packets from being transmitted to the UE, thereby degrading the quality of data received by the UE and resulting in a poor user experience.

Disclosed herein is a method and system to help address these or other issues. In accordance with the disclosure, a base station could determine whether to invoke handover of one of its served UEs based on the buffering of data destined to the UE. In particular, the base station could determine a buffer time and a packet drop rate for data destined to the UE. The buffer time could be an elapsed time from recording the data in the base station's data buffer to retrieving the data from the data buffer in order to transmit the data to the UE, while the packet drop rate could be a rate at which data packets destined for the UE are discarded from the base station's data buffer. If the base station determines that the buffer time and/or the packet drop rate is threshold high, then the base station could responsively invoke handover of the UE to a neighboring base station or to another cell.

Accordingly, in one respect, disclosed is a method of managing handover of a UE from a source base station serving the UE to a target base station based on data buffering. As disclosed, the method includes the source base station receiving data destined to the UE. Upon receiving the data, the method includes the source base station recording the received data in a data buffer of the source base station. Further, the method includes retrieving the recorded data from the data buffer and transmitting the retrieved data from the source base station to the UE. The method then includes measuring elapsed time from the recording to the retrieving and invoking handover of the UE from the source base station to the target base station based at least in part on the measured elapsed time.

In another respect, disclosed is a base station. As disclosed, the base station includes an antenna structure for engaging in communication with UEs via an air interface, a backhaul communication interface for engaging in backhaul communication on a core access network, and a controller configured to control a handover of a UE served by the base station. The controller includes one or more processing units, non-transitory data storage, and program instructions stored in the data storage and executable by the one or more processing units to carry out various base station operations as described herein.

By way of example, the base station operations could include receiving data via the backhaul communication interface, the data being destined to the UE, recording the received data in a data buffer of the base station, retrieving the recorded data from the data buffer, and transmitting the retrieved data to the UE via the antenna structure. Further, the base station operations could include measuring elapsed time from the recording of the received data to the retrieving of the recorded data. The base station operations could then include invoking handover of the UE from the base station to a target neighboring base station based at least in part on the measured elapsed time.

In yet another respect, disclosed is a method of managing handover of a UE from a source base station serving the UE to a target base station based on data buffering. As disclosed, the method includes the source base station receiving data destined to the UE, where the received data includes both first data and second data. Further, the method includes recording the first and second data in a data buffer of the source base station. The method further includes retrieving the first data from the data buffer and transmitting the first data from the source base station to the UE. Also, the method includes discarding the second data from the data buffer. The method then includes performing a quality control process, the quality control process including at least one of the following: (i) measuring elapsed time from the recording of the first data to the retrieving of the first data, and invoking handover of the UE from the source base station to the target base station based at least in part on the measured elapsed time, or (ii) measuring a quantity of the discarded second data, and invoking handover of the UE from the source base station to the target base station based at least in part on the measured quantity of the discarded second data.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
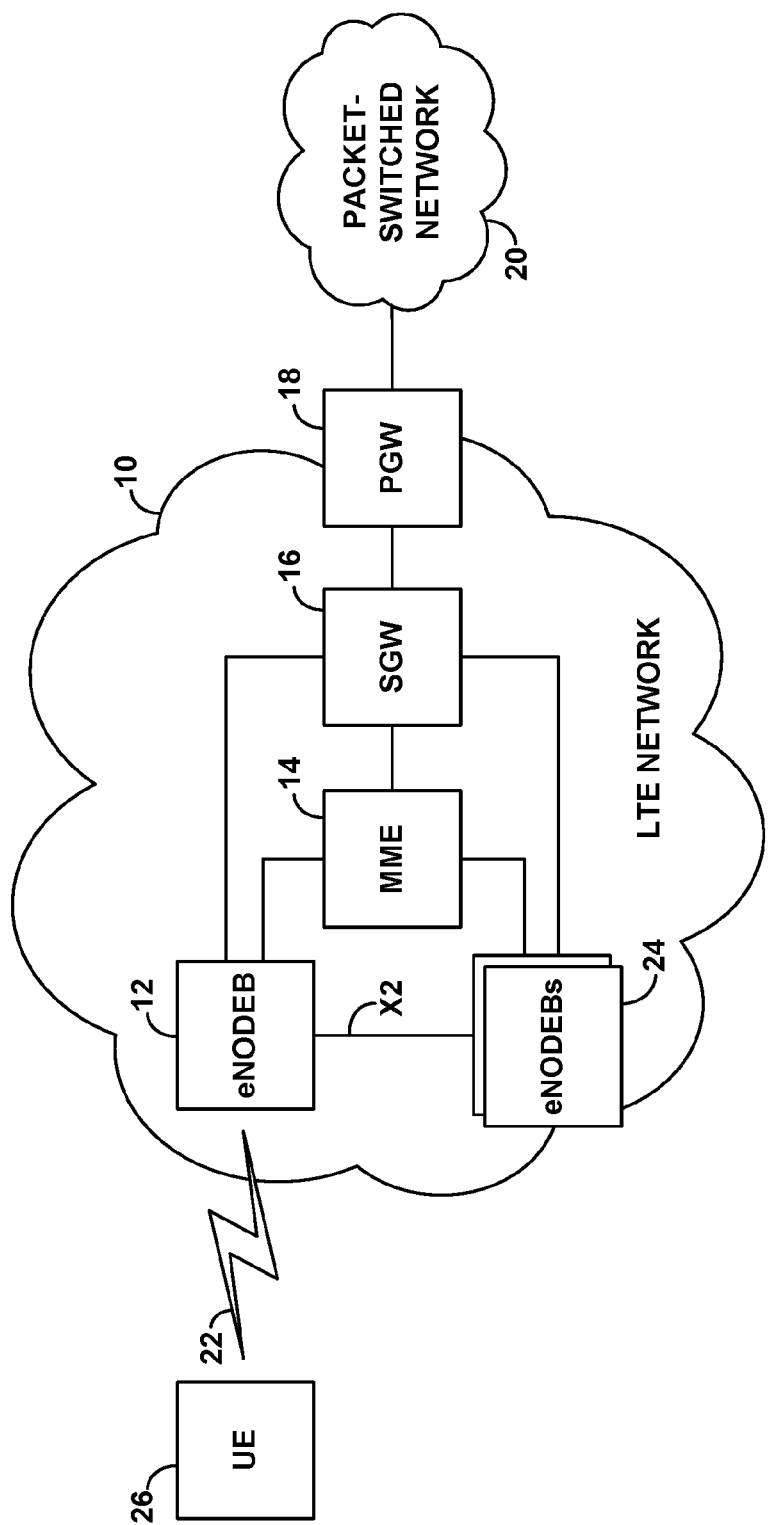
FIG. 1 is a simplified block diagram of a wireless communication system in which the present method and system can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve UEs with wireless packet data communication service, including possibly voice-over-packet service, but may also provide other functions. The LTE network may be implemented by a wireless service provider. As shown, the LTE network includes a core network 10 (or "evolved packet core (EPC)") could be a packet-switched network, compliant with the industry standard system architecture evolution (SAE) for the LTE protocol, and thus the entities shown on the core network could each have an IP address and be configured to communicate with each other over packet-based tunnels or other communication interfaces, some of which could be dynamically configured as needed to serve individual UEs for instance.

As shown, sitting on the core network 10 is by way of example an LTE base station 12, referred to as an evolved-Node-B (eNodeB), as well as a mobility management entity (MME) 14, a serving gateway (SGW) 16, and a packet data network (PDN) gateway (PGW) 18, with the PGW then providing connectivity with a packet-switched transport network 20 such as the Internet.

The eNodeB 12 is configured to provide a respective coverage area 22, such as a respective cell or sector, in which the eNodeB can serve UEs. As such, each eNodeB 12 could take various forms. For instance, eNodeB 12 could be a macro eNodeB of the type typically including a tower-mounted antenna structure and providing a broad of coverage. Or eNodeB 12 could be a small-cell eNodeB or the like (e.g., a femtocell, relay, etc.) of the type typically having a smaller form factor and providing a narrower range of coverage.

In practice, eNodeB 12 could have communication interfaces with the MME 14 and the SGW 16 and could be configured to communicate with the MME and the SGW over those interfaces, and the SGW could have communication interfaces with the PGW and could be configured to communicate with the PGW over those interfaces. Further, as shown in the figure, the network could include one or more additional eNodeBs 24 neighboring eNodeB 12. In this arrangement, eNodeB 12 could have communication interfaces with the neighboring eNodeBs 24, such as X2 interfaces, and the eNodeBs could be configured to communicate with each other over those interfaces. For instance, eNodeB 12 could communicate with neighboring eNodeBs 24 over an X2 interface in order to facilitate handover of a UE.

FIG. 1 further depicts a representative UE 26 within coverage of eNodeB 12 and its neighboring eNodeBs 24. When UE 26 first powers on or enters into coverage of the network, the UE may search for the strongest coverage it can find and, as noted above, may engage in a signaling process to register for service by the associated eNodeB. By way of example, we can assume that UE 26 detects a strongest reference signal from eNodeB 12 and thus engages in a process to register for service with eNodeB 12.

In a representative process, UE 26 may first engage in random-access signaling and radio-resource-control (RRC) configuration signaling with eNodeB 12 to establish an RRC connection as a radio-link-layer connection between UE 26 and eNodeB 12. Further, UE 26 may then engage in attach signaling via eNodeB 12 with MME 14, and MME 14 may facilitate authentication of UE 26 and coordinate establishment of one or more bearers between UE 26 and PGW 18 to enable UE 26 to engage in packet-data communication on transport network 20.

Once UE 26 is thus served by eNodeB 12, eNodeB 12 may then coordinate packet-data communication over the air to and from UE 26. For instance, when data arrives for UE 26 from network 20, PGW 18 may pass the data to SGW 16, SGW 16 may pass the data to eNodeB 12, and eNodeB 12 may then schedule and provide downlink transmission of the data over the air to UE 26. And when UE 26 has data to transmit on network 20, UE 26 may transmit a scheduling request over the air to eNodeB 12, eNodeB 12 may schedule uplink transmission of the data, UE 26 may transmit the data accordingly to eNodeB 12, and the data may pass to SGW 16 and to PGW 18, for transmission on network 20.

As noted above, the present disclosure addresses a data-buffering situation that may arise when resources on a carrier such as this are in threshold high use. This may occur when an eNodeB is serving just one UE and the UE is engaged in extensive communication, such as receiving data at a very high rate, and/or when the eNodeB is serving multiple UEs on the carrier and all of the UEs are receiving data concurrently, also possibly at a very high data rate. Given that the carrier has a finite extent of resources per unit time on which to schedule data transmissions, if the eNodeB receives too much data per unit time, then the eNodeB may need to buffer excess data for later transmission.

In practice, as noted above, the eNodeB may be arranged to monitor the level of resource use on the carrier and to determine when that resource use is threshold high, such as when a predefined percentage of the carrier resources are allocated per unit time (e.g., per frame of an LTE air interface, or an average over recent subframes). Further, upon detecting that the resource use on the carrier is threshold high, the eNodeB may be configured to begin imposing a per-UE rate cap for data transmission on the carrier. In particular, the eNodeB may be configured to limit the rate of data transmission to a UE on the carrier to be no greater than a predefined maximum data transmission rate.

As further noted above, the eNodeB may thus establish and maintain in data storage for each such UE a respective data buffer, comprising statically or dynamically sized storage for holding excess data destined to the UE. For instance, the eNodeB could reserve storage space for this use upon attachment of the UE, upon detecting the high level of carrier resource use generally, in response to detecting data transmission to the UE at a rate that exceeds the applicable rate cap, or in response to other triggers. This data buffer may serve to hold excess data for transmission to the UE, which could include any data that the eNodeB has received for transmission to the UE and has not yet transmitted to the UE. For instance, when the eNodeB receives from the SGW data for transmission to the UE, the eNodeB may store the data in such a buffer pending scheduling and transmission of the data over the air to the UE.

In turn, the act of buffering excess data for transmission to the UE may then comprise recording, in the data buffer, data that the eNodeB has received for transmission to the UE to the extent that the rate of the received data exceeds the rate cap. For instance, if the eNodeB is receiving data for transmission to the UE at a rate of N bits per second and the UE's rate cap is M bits per second, where N>M, the eNodeB may record in the data buffer a total of N-M bits per second, on a first-in first-out basis. As such, the eNodeB will retrieve data from the data buffer at a rate of up to M bits per second, starting with the data that has been recorded in the data buffer the longest, and transmit the retrieved data to the UE.

In another example, the rate at which the eNodeB transmits data to the UE may be limited by various operating conditions of the UE. For instance, if the UE is located in a weak coverage area or otherwise receives poor signal quality from the eNodeB (e.g., due to a low signal-to-noise ratio), then the rate at which data is received by the UE could be limited. As such, the eNodeB could receive data for transmission to the UE at a rate that exceeds the UE's limited receiving rate, and the excess data received by eNodeB could then be buffered as described above. Other examples are possible as well.

As further noted above, to help manage data storage resources by avoiding uncontrollable growth in the amount of data that the eNodeB buffers for a UE, the eNodeB may also discard data from the data buffer based on how full the data buffer is, for instance. By way of example, the eNodeB could apply a buffer-fullness threshold, which could be a specific measure of quantity of data, such as a number of bits or bytes (e.g., a number of megabits), as a maximum or near maximum quantity of data that the eNodeB would store in the data buffer. Alternatively, the buffer-fullness threshold could be a percentage or other measure of fullness of the data buffer, considering the quantity of data buffered versus the size of the data buffer. As a specific example, the buffer-fullness threshold could be a percentage value such as a value over 90 percent. In any case, if the fullness of the data buffer exceeds the buffer-fullness threshold, then the eNodeB could discard one or more data packets from the data buffer in order to keep the amount of data in the data buffer below the buffer-fullness threshold.

As another example, the eNodeB could also discard data from the data buffer based on how long the data has been recorded in the data buffer. For instance, the eNodeB could apply a buffer-time threshold, which could be a specific measure of time, such as an amount of time that has elapsed since recording a data packet in the data buffer. In practice, the eNodeB could determine, for each data packet recorded in the data buffer, how much time has elapsed since recording the data packet in the data buffer and discard any data packet for which the determined elapsed time exceeds the buffer-time threshold.

Per the present disclosure, the eNodeB could be arranged to measure, as part of the data buffering process, a buffer time for data stored in the data buffer. For instance, the eNodeB could measure an elapsed time from recording data into the data buffer to retrieving the data from the buffer. By way of example, upon recording a data packet into the data buffer, the eNodeB could assign a timestamp to the recorded data, the timestamp indicating the time at which the data was recorded into the data buffer. Then, upon retrieving the data packet from the data buffer for transmission to the UE, the eNodeB could compare the time of retrieval to the time of the timestamp and measure the difference between these times. In this manner, the eNodeB could measure a buffer time for each data packet stored in the data buffer.

Further, the eNodeB could be arranged to invoke handover of the UE based at least in part on the measured buffer times. In the context of FIG. 1, for instance, eNodeB 12 could invoke handover of UE 26 to one of the neighboring eNodeBs 24 or to some other cell based on the measured buffer times of data destined to UE 26. By way of example, the eNodeB could compare the measured buffer times to a predefined time duration. For instance, the eNodeB could measure buffer times for each data packet retrieved from the data buffer over a recent time period and compare these measured buffer times to the predefined time duration. If at least a threshold high number of the measured buffer times exceed the predefined time duration, then the eNodeB could decide to invoke handover of the UE to a neighboring eNodeB or some other cell. As another example, the eNodeB could determine an average buffer time from the buffer times measured over the recent time period and compare the average buffer time to the predefined time duration. If the average buffer time exceeds the predefined time duration, then the eNodeB could decide to invoke handover of the UE to a neighboring eNodeB or some other cell. Other examples could be possible as well.

Additionally or alternatively, the eNodeB could be arranged to measure, as part of the data buffering process, an extent of data discarded from the data buffer. By way of example, the eNodeB could measure a quantity of discarded data, such as a number of packets, bits, or bytes (e.g., a number of megabits) discarded from the data buffer over a recent time period. As such, the eNodeB could be further arranged to invoke handover of the UE based at least in part on the measured quantity of discarded data. In the context of FIG. 1, eNodeB 12 could invoke handover of UE 26 to one of the neighboring eNodeBs 24 or some other cell based on the measured quantity of data destined to UE 26 that is discarded from the data buffer. For instance, if the measured quantity of data discarded from the data buffer over a recent time period exceeds a predefined threshold quantity, then eNodeB 12 could responsively decide to invoke handover of UE 26 to one of the neighboring eNodeBs 24 or some other cell.

Accordingly, eNodeB 12 could invoke handover of UE 26 to one of the neighboring eNodeBs 24 or some other cell based on either or both of (i) buffering times for data destined to UE 26 or (ii) the quantity of data destined to UE 26 that is discarded from the data buffer.

In practice, eNodeB 12 could invoke handover of UE 26 in a number of ways. For instance, UE 26 may receive from eNodeB 12, or otherwise be provisioned with, one or more measurement events that define situations when UE 26 should transmit measurement reports to eNodeB 12 to facilitate possible handover. LTE defines several such measurement events, including (i) Event A3, which is triggered when a neighboring cell becomes better than the serving cell by a defined threshold offset, (ii) Event A4, which is triggered when a neighboring cell becomes better than a defined threshold level, and (iii) Event A5, which is triggered when the serving cell becomes worse than a threshold and a neighboring cell becomes better than a threshold. UE 26 may thus regularly evaluate coverage strength (e.g., reference signal receive power (RSRP) and/or reference signal receive quality (RSRQ) or the like) from eNodeB 12 as well as from the other neighboring eNodeBs 24. And when UE 26 detects that a measurement event occurs, UE 26 may responsively transmit to serving eNodeB 12 a measurement report informing eNodeB 12 of the detected coverage strength(s) to enable eNodeB 12 to process handover of UE 26 if appropriate.

Thus, in order to invoke handover of UE 26, eNodeB 12 could refer to a recent measurement report and identify as the target eNodeB, the eNodeB having the strongest coverage as detected by UE 26. Alternatively, if UE 26 has not recently provided a measurement report to eNodeB 12, then eNodeB 12 could instruct UE 26 to scan for nearby coverage and provide a measurement report from which eNodeB 12 could identify a target eNodeB.

In a representative handover process, serving eNodeB 12 may transmit to the identified target eNodeB a handover request message, the target eNodeB may reserve resources to facilitate serving UE 26, serving eNodeB 12 and/or MME 14 may transfer one or more bearers to the target eNodeB, and serving eNodeB 12 may transmit to UE 26 a directive for UE 26 to transition from being served by eNodeB 12 to being served by the target eNodeB.

Figure 2:
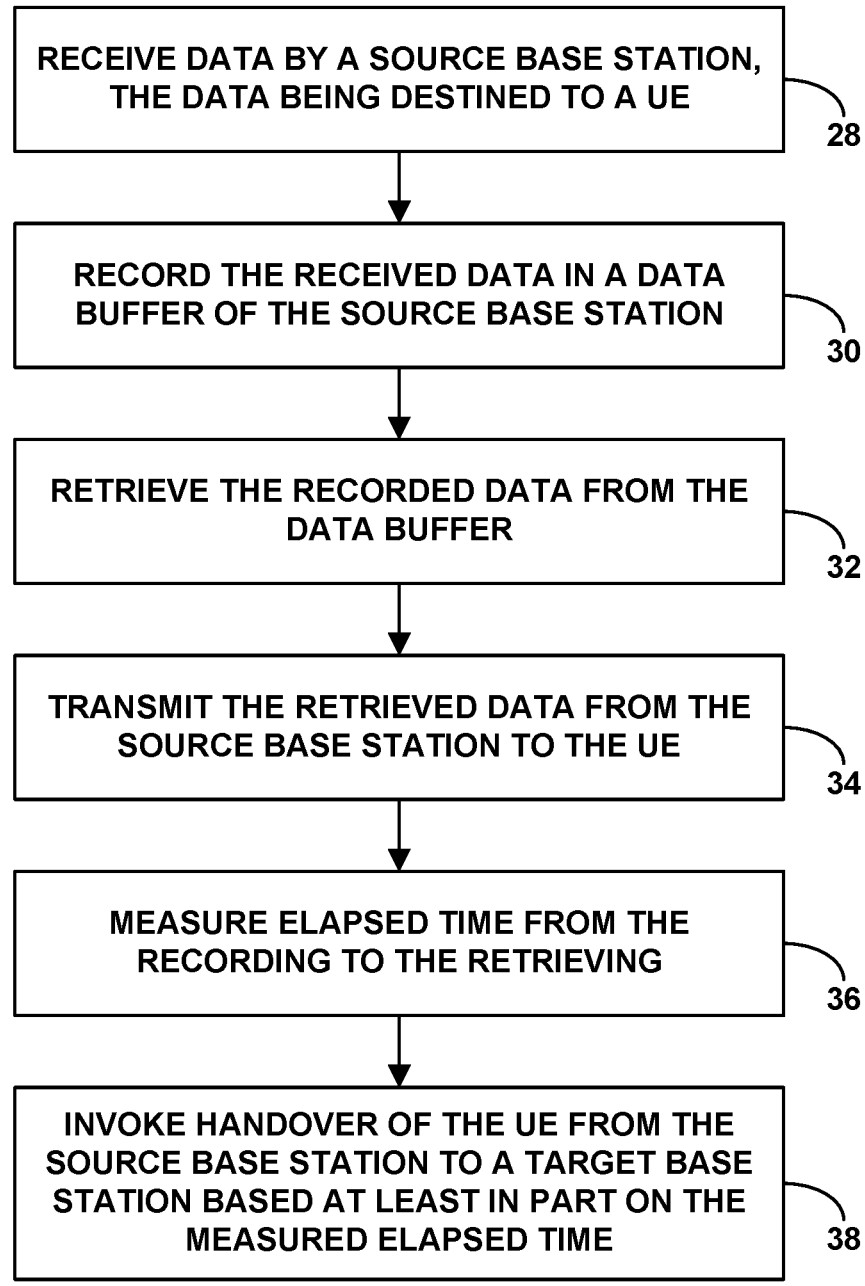
FIG. 2 is a flow chart depicting example operations in accordance with the disclosure.

FIG. 2 is next a flow chart depicting a method that could be carried out by a representative source base station, to help manage handover of one of its served UEs to a target base station. As shown in FIG. 2, at block 28, the method involves the source base station receiving data destined to the UE. At block 30, the method then involves recording the received data in a data buffer of the source base station. And at block 32, the method involves retrieving the recorded data from the data buffer. Then at block 34, the method involves transmitting the retrieved data from the source base station to the UE. At block 36, the method involves the source base station measuring an elapsed time from the recording to the retrieving. And at block 38, the method involves the source base station invoking handover of the UE from being served by the source base station to being served by the target base station based at least in part on the measured elapsed time.

In line with the discussion above, the received data could include a number of data packets, such that the act of measuring elapsed time from the recording to the retrieving in this process could involve measuring an elapsed time from the recording to the retrieving for each data packet of the number of data packets. And the act of invoking handover of the UE based at least in part on the measured elapsed time could involve invoking handover of the UE based at least in part on an average elapsed time for the number of data packets being greater than a predefined time duration or based at least in part on a threshold high quantity of data packets having a measured elapsed time greater than a predefined time duration.

Figure 3:
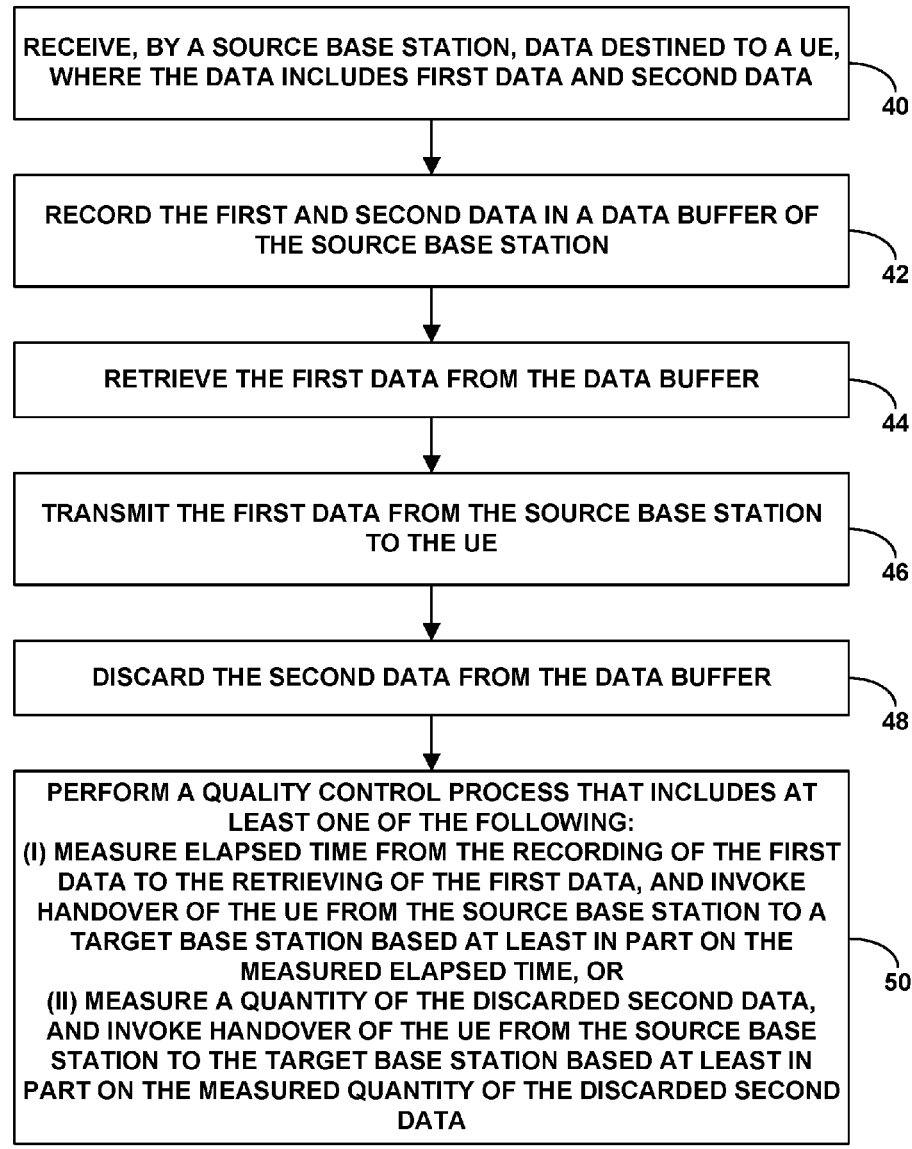
FIG. 3 is another flow chart depicting example operations in accordance with the disclosure.

FIG. 3 is next another flow chart depicting an alternative embodiment of the method, again as may be carried out by a representative source base station, to help manage handover of one of its served UEs to a target base station. As shown in FIG. 3, at block 40, the method involves the source base station receiving data destined to the UE, the data including first data and second data. And at block 42, the method involves recording the first and second data in a data buffer of the source base station. At block 44, the method then involves, the source base station retrieving the first data from the data buffer. And at block 46, the method involves transmitting the first data from the source base station to the UE.

Further, at block 48, the method involves discarding the second data from the data buffer. And at block 50, the method involves the source base station performing a quality control process, where the quality control process includes at least one of the following: (i) measuring elapsed time from the recording to the retrieving, and invoking handover of the UE from the source base station to the target base station based at least in part on the measured elapsed time, or (ii) measuring a quantity of the discarded second data, and invoking handover of the UE from the source base station to the target base station based at least in part on the measured quantity of the discarded second data.

In line with the discussion above, the first data could include a number of data packets, such that the act of measuring elapsed time from the recording to the retrieving in this process could involve measuring an elapsed time from the recording to the retrieving for each data packet of the number of data packets. And the act of invoking handover of the UE based at least in part on the measured elapsed time could involve invoking handover of the UE based at least in part on an average elapsed time for the number of data packets being greater than a predefined time duration or based at least in part on a threshold high quantity of data packets having a measured elapsed time greater than a predefined time duration.

Likewise, the act of discarding the second data from the data buffer could involve discarding the second data from the data buffer based on a fullness state of the data buffer or based on the second data being recorded in the data buffer for at least a predefined duration. Further, the act of measuring a quantity of the discarded second data could involve measuring a quantity of discarded second data over a recent time period, and the act of invoking handover of the UE based at least in part on the measured quantity of discarded second data could involve invoking handover of the UE based at least in part on the measured quantity of discarded second data being greater than a predefined quantity of data.

Figure 4:
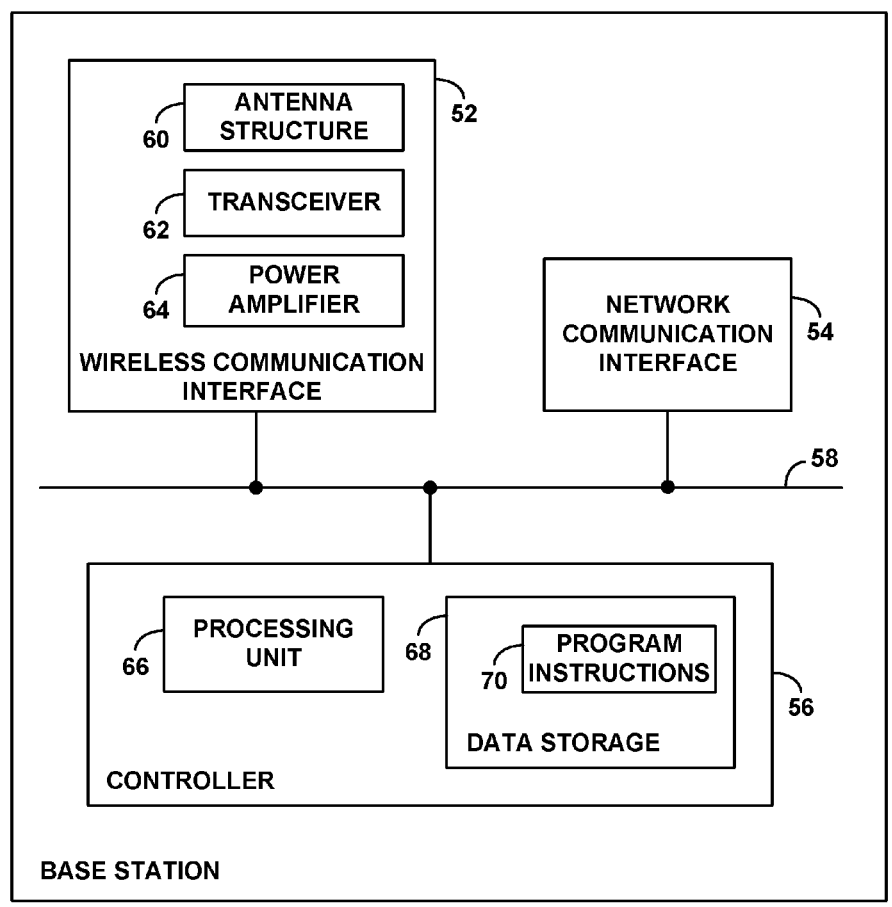
FIG. 4 is a simplified block diagram of an example base station operable in accordance with the disclosure.

Finally, FIG. 4 is a simplified block diagram of a base station (e.g., macro eNodeB, small cell, or other type of base station), showing some of the components that such an entity may include in order to carry out these and other operations. As shown, the example base station includes a wireless communication interface 52, a network communication interface 54, and a controller 56, all of which could be integrated together in various ways or, as shown, interconnected with each other through a system bus, network, or other connection mechanism 58.

Wireless communication interface 52 includes an antenna structure (e.g., one or more antennas or antenna elements) 60, which could be tower mounted or provided in some other manner, configured to transmit and receive over the air interface and thereby facilitate communication with served UEs. Further, the wireless communication interface includes a transceiver 62 and power amplifier 64 supporting air interface communication according to the LTE protocol. Network communication interface 54 may then comprise one or more wired and/or wireless network interfaces (such as an Ethernet interface) through which the base station may receive data over a backhaul connection with SGW 16 as discussed above.

Controller 56, which may be integrated with wireless communication interface 52 or with one or more other components of the eNodeB, may then be configured to manage communication over the air interface, including managing buffering of data in accordance with the present disclosure. By way of example, controller 56 is shown including a processing unit (e.g., one or more microprocessors or other processors) 66, data storage (e.g., one or more volatile and/or non-volatile non-transitory storage components, such as magnetic, optical, and/or flash storage) 68, and program instructions 70 stored in the data storage 68, executable by the processing unit 66 to carry out various disclosed base station operations.

By way of example, controller 56 may be configured to (a) receive data via network communication interface 54, the data being destined to the UE, (b) record the received data in a data buffer of the base station, (c) retrieve the recorded data from the data buffer, (d) transmit the retrieved data to the UE via the antenna structure, (e) measure elapsed time from the recording to the retrieving, and (f) invoke handover of the UE from the base station to a target neighboring base station based at least in part on the measured elapsed time.

Exemplary embodiments have been described above. Those skilled in the art will understand, however, that changes and modifications may be made to these embodiments without departing from the true scope and spirit of the invention.

What is claimed is:

1. A method of managing handover of a user equipment device (UE) from a source base station serving the UE to a target base station, the method comprising:
   receiving data by the source base station, the data being destined to the UE;
   recording the received data in a data buffer of the source base station;
   retrieving the recorded data from the data buffer;
   transmitting the retrieved data from the source base station to the UE;
   measuring elapsed time from the recording to the retrieving; and
   invoking handover of the UE from the source base station to the target base station based at least in part on the measured elapsed time.

2. The method of claim 1, further comprising determining that the measured elapsed time from the recording to the retrieving is greater than a predefined threshold, wherein invoking handover of the UE is based at least in part on the determining that the measured elapsed time is greater than the predefined threshold.

3. The method of claim 2, wherein the received data comprises a plurality of data packets, wherein measuring elapsed time from the recording to the retrieving comprises measuring elapsed time from recording to retrieving each data packet of the plurality of data packets, wherein determining that the measured elapsed time from the recording to the retrieving is greater than the predefined threshold comprises determining that, for at least a threshold quantity of the plurality of data packets, the measured elapsed time from the recording and the retrieving is greater than the predefined threshold, and wherein invoking handover of the UE is further based on the measured elapsed time being greater than the predefined threshold for at least the threshold quantity of the plurality of data packets.

4. The method of claim 1, wherein the received data comprises a plurality of data packets, wherein measuring elapsed time from the recording to the retrieving comprises determining an average elapsed time from recording to retrieving each data packet of the plurality of data packets, and wherein handover of the UE is invoked based on the determined average elapsed time being greater than a predefined threshold.

5. The method of claim 1, wherein the received data comprises a plurality of data packets, and wherein measuring elapsed time from the recording to the retrieving comprises, for each respective data packet of the plurality of data packets:
identifying a first time at which the respective data packet is recorded in the data buffer;
identifying a second time at which the respective data packet is retrieved from the data buffer; and
determining a time difference between the first and second times.

6. A base station comprising:
an antenna structure for engaging in communication with user equipment devices (UEs) via an air interface;
a backhaul communication interface for engaging in backhaul communication on a core access network; and
a controller configured to control a handover of a UE served by the base station, wherein the controller is configured to:
receive data via the backhaul communication interface, the data being destined to the UE,
record the received data in a data buffer of the base station,
retrieve the recorded data from the data buffer,
transmit the retrieved data to the UE via the antenna structure,
measure elapsed time from the recording to the retrieving, and
invoke handover of the UE from the base station to a target neighboring base station based at least in part on the measured elapsed time.

7. The base station of claim 6, wherein the controller is further configured to determine that the measured elapsed time from the recording to the retrieving is greater than a predefined threshold, wherein the controller invokes handover of the UE based at least in part on the determining that the measured elapsed time is greater than the predefined threshold.

8. The base station of claim 7, wherein the received data comprises a plurality of data packets, wherein measuring elapsed time from the recording to the retrieving comprises measuring elapsed time from recording to retrieving each data packet of the plurality of data packets, wherein determining that the measured elapsed time from the recording to the retrieving is greater than the predefined threshold comprises determining that, for at least a threshold quantity of the plurality of data packets, the measured elapsed time from the recording and the retrieving is greater than the predefined threshold, and wherein invoking handover of the UE is further based on the measured elapsed time being greater than the predefined threshold for at least the threshold quantity of the plurality of data packets.

9. The base station of claim 6, wherein the received data comprises a plurality of data packets, wherein measuring elapsed time from the recording to the retrieving comprises determining an average elapsed time from recording to retrieving each data packet of the plurality of data packets, and wherein handover of the UE is invoked based on the determined average elapsed time being greater than a predefined threshold.

10. The base station of claim 6, wherein the received data comprises a plurality of data packets, and wherein measuring elapsed time from the recording to the retrieving comprises, for each respective data packet of the plurality of data packets:
identifying a first time at which the respective data packet is recorded in the data buffer;
identifying a second time at which the respective data packet is retrieved from the data buffer; and
determining a time difference between the first and second times.

11. The base station of claim 6, wherein the base station is a Long Term Evolution (LTE) eNodeB and the air interface is an LTE air interface.

12. A method of managing handover of a user equipment device (UE) from a source base station serving the UE to a target base station, the method comprising:
receiving, by the source base station, data destined to the UE, wherein the received data comprises first data and second data;
recording the first and second data in a data buffer of the source base station;
retrieving the first data from the data buffer;
transmitting the first data from the source base station to the UE;
discarding the second data from the data buffer; and
performing a quality control process comprising at least one of the following:
(i) measuring elapsed time from the recording to the retrieving, and invoking handover of the UE from the source base station to the target base station based at least in part on the measured elapsed time, or
(ii) measuring a quantity of the discarded second data, and invoking handover of the UE from the source base station to the target base station based at least in part on the measured quantity of the discarded second data.

13. The method of claim 12, wherein invoking handover of the UE from the source base station to the target base station based at least in part on the measured elapsed time comprises:
determining that the measured elapsed time from the recording to the retrieving is greater than a predefined threshold; and
invoking handover of the UE from the source base station to the target base station based at least in part on the determining that the measured elapsed time from the recording to the retrieving is greater than the predefined threshold.

14. The method of claim 12, wherein invoking handover of the UE from the source base station to the target base station based at least in part on the measured quantity of the discarded second data comprises:

determining that the measured quantity of the discarded second data is greater than a predefined threshold; and invoking handover of the UE from the source base station to the target base station based at least in part on the determining that the measured quantity of the discarded second data is greater than the predefined threshold.

15. The method of claim 12, wherein performing the quality control process comprises:

measuring the elapsed time from the recording to the retrieving;

measuring the quantity of the discarded second data; and invoking handover of the UE from the source base station to the target base station based on both (i) the measured elapsed time being greater than a predefined threshold amount and (ii) the measured quantity of the discarded second data being greater than a predefined threshold quantity.

16. The method of claim 13, wherein the first data comprises a plurality of data packets, wherein measuring elapsed time from the recording to the retrieving comprises measuring elapsed time from recording to retrieving each data packet of the plurality of data packets, wherein determining that the measured elapsed time from the recording to the retrieving is greater than the predefined threshold comprises determining that, for at least a threshold quantity of the plurality of data packets, the measured elapsed time from the recording and the retrieving is greater than the predefined threshold, and wherein invoking handover of the UE based at least in part on the measured elapsed time comprises invoking handover of the UE based at least in part on the measured elapsed time being greater than the predefined threshold for at least the threshold quantity of the plurality of data packets.

17. The method of claim 12, wherein the first data comprises a plurality of data packets, wherein measuring elapsed time from the recording to the retrieving comprises determining an average elapsed time from recording to retrieving each data packet of the plurality of data packets, and wherein invoking handover of the UE based at least in part on the measured elapsed time comprises invoking handover of the UE based at least in part on the determined average elapsed time being greater than a predefined threshold.

18. The method of claim 12, further comprising determining a fullness state of the data buffer, wherein the source base station discards the second data from the data buffer based on the determined fullness state of the data buffer being greater than a predefined fullness threshold.

19. The method of claim 12, further comprising determining that the second data has been recorded in the data buffer for at least a predefined threshold duration, wherein the source base station discards the second data from the data buffer based on the determining that the second data has been recorded in the data buffer for at least the predefined threshold duration.

20. The method of claim 12, wherein the received data comprises a plurality of data packets, and wherein measuring elapsed time from the recording to the retrieving comprises, for each respective data packet of the plurality of data packets:

identifying a first time at which the respective data packet is recorded in the data buffer;

identifying a second time at which the respective data packet is retrieved from the data buffer; and determining a time difference between the first and second times.

\* \* \* \* \*